United States Patent
Asmanis et al.

(10) Patent No.: US 9,246,598 B2
(45) Date of Patent: Jan. 26, 2016

(54) EFFICIENT PULSE AMPLITUDE MODULATION INTEGRATED CIRCUIT ARCHITECTURE AND PARTITION

(71) Applicant: Avago Technologies General IP (Singapore) Pte. Ltd., Singapore (SG)

(72) Inventors: Georgios Asmanis, Lake Forest, CA (US); Faouzi Chaahoub, San Jose, CA (US)

(73) Assignee: Avago Technologies General IP (Singapore) Pte. Ltd., Singapore (SG)

( * ) Notice: Subject to any disclaimer, the term of this patent is extended or adjusted under 35 U.S.C. 154(b) by 40 days.

(21) Appl. No.: 14/174,155

(22) Filed: Feb. 6, 2014

(65) Prior Publication Data
US 2015/0222366 A1    Aug. 6, 2015

(51) Int. Cl.
| | |
|---|---|
| H04B 10/00 | (2013.01) |
| H04B 10/588 | (2013.01) |
| H04B 10/54 | (2013.01) |
| H04B 10/50 | (2013.01) |

(52) U.S. Cl.
CPC ............ *H04B 10/588* (2013.01); *H04B 10/505* (2013.01); *H04B 10/541* (2013.01)

(58) Field of Classification Search
CPC ............. H04B 10/5055; H04B 10/588; H04B 10/541; H04B 10/505
See application file for complete search history.

(56) References Cited

U.S. PATENT DOCUMENTS

| | | | | |
|---|---|---|---|---|
| 5,761,246 | A * | 6/1998 | Cao ........................... | H04L 5/04 370/537 |
| 7,095,788 | B1 * | 8/2006 | Cao ........................ | H03K 17/693 370/537 |
| 7,110,681 | B1 * | 9/2006 | Mizuochi ............. | H04B 10/505 341/53 |
| 7,113,550 | B2 * | 9/2006 | Stonecypher ....... | H04L 25/4919 341/56 |
| 7,308,058 | B2 * | 12/2007 | Zerbe ..................... | H04L 1/0003 375/259 |
| 7,408,755 | B1 | 8/2008 | Ye et al. | |
| 7,447,278 | B2 * | 11/2008 | Menolfi ................ | H04L 7/0334 375/290 |
| 7,893,724 | B2 * | 2/2011 | Moyal et al. ..................... | 327/12 |
| 8,385,439 | B2 * | 2/2013 | Djordjevic ......... | H04B 10/2569 375/260 |
| 2001/0015709 | A1 * | 8/2001 | Imajo .................. | G02F 1/13452 345/87 |
| 2004/0027762 | A1 | 2/2004 | Ohi et al. | |
| 2004/0081212 | A1 * | 4/2004 | Schrodinger .............. | 372/38.02 |

(Continued)

FOREIGN PATENT DOCUMENTS

EP    1712055 B1    1/2013

OTHER PUBLICATIONS

"Coherent Lightwave Signal Analyzer", OM4000 Series Datasheet, Tektronix, Mar. 5, 2013, 16 pages.

(Continued)

*Primary Examiner* — Danny Leung (57) ABSTRACT

A transmitter is disclosed as being configured to encode optical signals in accordance with a multi-level coding scheme. The transmitter includes an Integrated Circuit architecture and partition that relaxes the bandwidth and linearity constraints of a gearbox-to-laser driver interface. In the proposed architecture, the gearbox Integrated Circuit aligns two or more digital data streams and transmits the aligned two or more data streams to the laser driver via separate signals.

20 Claims, 11 Drawing Sheets

(56) References Cited

U.S. PATENT DOCUMENTS

| | | | |
|---|---|---|---|
| 2004/0141569 A1* | 7/2004 | Agazzi | H04B 10/2575 375/302 |
| 2006/0111074 A1* | 5/2006 | Petilli | H04B 1/001 455/334 |
| 2007/0025283 A1* | 2/2007 | Koslov | H04B 7/18517 370/316 |
| 2007/0252565 A1 | 11/2007 | Wang et al. | |
| 2008/0304197 A1 | 12/2008 | Higashi | |
| 2009/0051675 A1* | 2/2009 | Huang | G06F 1/12 345/204 |
| 2010/0119007 A1* | 5/2010 | Kawahara | H04B 10/5055 375/296 |
| 2011/0069784 A1 | 3/2011 | Petilli | |
| 2011/0158654 A1* | 6/2011 | Zhang | H04B 10/5053 398/158 |
| 2011/0284507 A1* | 11/2011 | Deladurantaye | H10S 5/06835 219/121.62 |
| 2012/0016650 A1* | 1/2012 | Hollis | G06F 17/5036 703/13 |
| 2012/0206174 A1 | 8/2012 | Maruyama et al. | |
| 2012/0321323 A1* | 12/2012 | Huang | H04B 10/5053 398/185 |
| 2013/0128943 A1* | 5/2013 | Doron | H03G 3/002 375/232 |
| 2013/0241622 A1* | 9/2013 | Zerbe | G11C 7/02 327/323 |
| 2015/0071651 A1* | 3/2015 | Asmanis | H04B 10/524 398/141 |
| 2015/0249501 A1* | 9/2015 | Nagarajan | H04B 10/2575 398/79 |

OTHER PUBLICATIONS

Lee, et al., "Design and Comparison of Three 20-Gb/s Backplane Transceivers for Duobinary, PAM4, and NPZ Data", IEEE Journal of Solid-State Circuits, vol. 43. No. 9, Sep. 2008, 14 pages.

Official Action for U.S. Appl. No. 14/020,399, mailed Dec. 22, 2014.

Toifl et al., "A 22-Gbls PAM-4 Receiver in 90-nm CMOS SOI Technology", IEEE Journal of Solid-State Circuits, vol. 41, No. 4, Apr. 2006, 12 pages.

Park, Peter, "A 4PAM/2PAM Coaxial Cable Receiver Analog Front-End Targeting 40Gb/s in 90-nm CMOS", Graduate Department of Electrical and Computer Engineering, University of Toronto, 2008, 113 pages.

* cited by examiner

EFFICIENT PULSE AMPLITUDE MODULATION INTEGRATED CIRCUIT ARCHITECTURE AND PARTITION

FIELD OF THE DISCLOSURE

The present disclosure is generally directed toward data transmission and reception and, in particular, toward mechanisms for use in fiber optic-based data transmission systems.

BACKGROUND

Data transmissions in enterprise optical communication systems have not relied on overly-complicated encoding and/or decoding schemes because the technology has been more than sufficient to support desired data transmission rates. However, as computing devices become faster and the need for increased data transmission rates is realized, the physical limits of optical devices will become a limiting factor. Accordingly, optical communication systems will begin heading toward the use of more complicated encoding and decoding schemes.

Pulse-Amplitude Modulation (PAM) is a form of signal modulation where the message information is encoded in the amplitude of a series of signal pulses. It is pulse modulation scheme in which the amplitudes of a train of carrier pulses are varied according to the sample value of the message signal. Demodulation of a PAM-encoded signal is performed by detecting the amplitude level of the carrier at every symbol period.

In a PAM-4-based optical link, two Non-Return-to-Zero (NRZ)-coded two-level signals are combined together in a PAM-4 encoder to create a single PAM four-level signal. The PAM-4 signal is the signal that is ultimately transmitted across a communication network (e.g., through fiber optics). An advantage of a PAM-4 encoding scheme is that the four-level code utilizes the same baud, or symbol rate, of either of the two NRZ codes while containing twice the information of either. This is an attractive solution when the components of the link are baud rate limited, as is often the case for very high-speed fiber links.

Figure 1A:
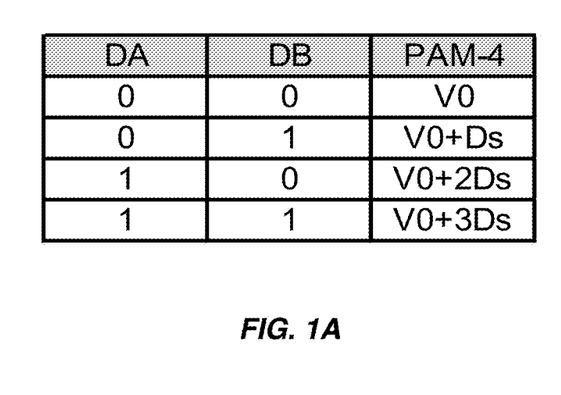
FIG. 1A depicts a conventional PAM-4 encoding table.
Figure 1B:
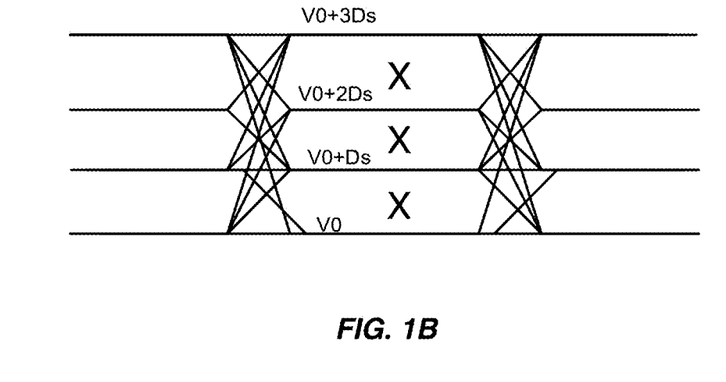
FIG. 1B depicts signals output by encoding according to the table of FIG. 1A.

Traditional PAM-4 signaling has a strict linearity requirement. Specifically, any PAM signal (e.g., PAM-N, where N is an integer greater than or equal to 4) has been traditionally constrained by the requirement that each signal level is uniformly spaced apart from adjacent signal levels. A conventional PAM-4 encoder translates two NRZ signals (DA and DB) to a PAM-4 signal via a table as shown in FIG. 1A, where a constant value, Ds, is used to define the spacing between adjacent levels. In other words, as shown in FIG. 1B, the base level where DA and DB are both '0' results in a PAM-4 signal of V0. The next level, where DA is '0', but DB is '1' results in a PAM-4 signal of V0+Ds. Each subsequent level is greater than the previous level by the constant, Ds.

A PAM-4 receiver then decodes the PAM-4 signal received from the encoder and recovers the original two NRZ (DA and DB) data streams. The receiver samples the PAM-4 signal at N-1 (e.g., 3 points in a PAM-4 signal) at a common sample time (e.g., ts) and performs an inverse mapping to the encoder table of FIG. 1A. In this way, the PAM-4 encoder behaves much like a Digital-to-Analog converter and the PAM-4 receiver behaves much like an Analog-to-Digital converter.

The strict linearity of encoding and sampling works well for pure electronic systems whose behavior is relatively linear, but the strict linearity presents a number of problems in optical systems due to non-idealities and the non-linear behavior of optical components.

BRIEF DESCRIPTION OF THE DRAWINGS

The present disclosure is described in conjunction with the appended figures, which are not necessarily drawn to scale.

DETAILED DESCRIPTION

Various aspects of the present disclosure will be described herein with reference to drawings that are schematic illustrations of idealized configurations.

While certain examples of systems and methods will be described with reference to a particular multi-level digital encoding scheme, embodiments of the present disclosure are not so limited. More specifically, while certain embodiments of the present disclosure are depicted and described in connection with a PAM-4 signal, it should be appreciated that embodiments of the present disclosure are not limited to systems utilizing PAM-4 encoding. Rather, embodiments of the present disclosure have applicability to more complicated coding schemes. The examples of a PAM-4 encoding scheme are intended to provide an easy-to-understand example or set of examples. It should be appreciated that the concepts disclosed herein can be applied to any type of multi-level encoding scheme (e.g., PAM-5, PAM-6, PAM-8, . . . , PAM-32, etc.).

Moreover, embodiments of the present disclosure are not necessarily limited to systems that employ a laser to modulate the signals. The embodiments described herein reference the use of lasers for signal modulation since it has been observed that lasers and laser diodes have different non-linear behavior and/or non-ideal behavior at different levels (e.g., different transmission voltages). It should, however, be apparent to those of ordinary skill in the art that embodiments of the present disclosure are not limited to communication systems employing lasers for signal modulation and/or demodulation.

While multi-level encoding is useful for increasing the data transmission rate of a communication system, the price paid for this encoding technique is the additional complexity of introducing the multi-level encoded signal at the transmit end and accurately decoding the signal at the receiving end. More specifically, as a non-limiting example, complications arise in decoding when the optical modulation which creates the optical PAM-4 signal is supplied by directly modulating a laser. Due to the inherent non-linear and/or non-ideal behavior of semiconductor lasers, the laser's modulation speed is dependent on the drive level of the current that is supplying the modulation signal.

In addition to non-idealities introduced by the laser of an optical communication system, other components are known to further introduce non-idealities and/or non-linearities into the system, thereby making the traditional techniques of encoding and decoding (where strict linearity is required) less desirable. Examples of such non-idealities and/or non-linearities include the linearity (or lack thereof) of the laser driver LI curves, the asymmetry (or lack thereof) of the dynamic response of the laser diode that leads to different and level-dependent rise and fall times, the non-linearity of the photodetector and Transimpedance Amplifier (TIA), the level-dependent noise to the transmitted PAM-4 signal, etc.

Figure 2A:
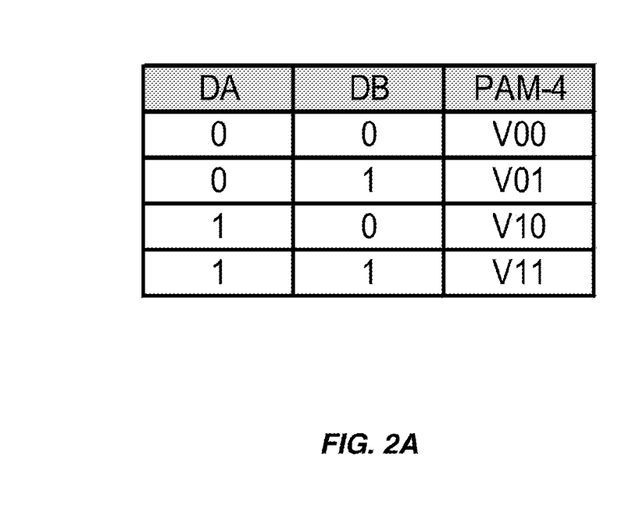
FIG. 2A depicts a PAM-4 encoding table in accordance with embodiments of the present disclosure.
Figure 2B:
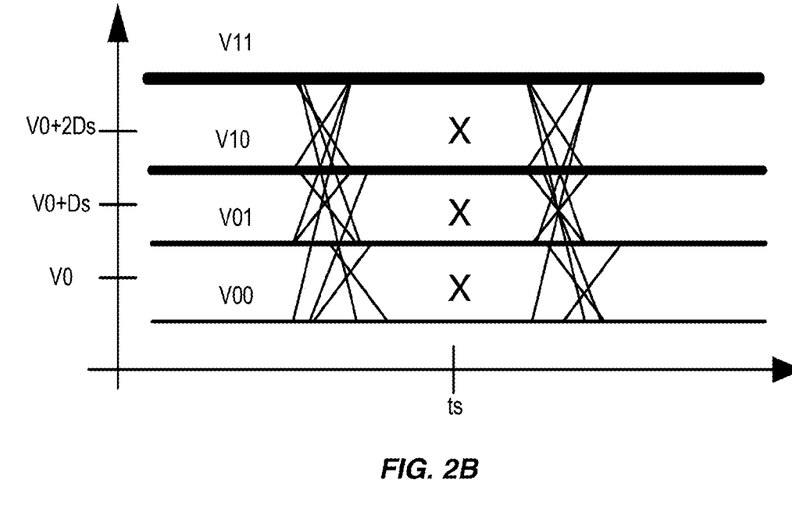
FIG. 2B depicts levels of a PAM-4 signal generated by optical components whose behavior is non-linear and/or non-ideal at higher levels in accordance with embodiments of the present disclosure.

In a PAM-4 situation, this implies that the response of the laser is fastest at the upper levels and slowest at the lower levels. This creates both a distortion in the optical eyes as well as a skew in the arrival time at the receive end of the communications link. Additionally, as shown in FIG. 2B, the noise introduced into the PAM-4 signal is level-dependent. More specifically, the voltage produced for the highest level of the PAM-4 signal has more noise than the lower level voltages produced by the same laser diode.

Accordingly, embodiments of the present disclosure propose the ability to account for and, in some situations, neutralize the non-linear and/or non-idealistic behavior of the components in an optical system utilizing PAM-N signals.

Signal Encoding and Transmission

A first aspect of the present disclosure is to compensate for the increasing noise produced at the higher voltages produced by a laser (or any other component exhibiting similar behavior). FIG. 2A shows an encoding table that can be used in accordance with embodiments of the present disclosure. More specifically, the encoding scheme proposed herein relaxes the strict linear constraints previously imposed on PAM-4 systems. Even more specifically, the PAM-4 signal produced for the various DA and DB values utilize non-uniform encoding. As an example, the lowest level of the PAM-4 signal corresponds to a condition where DA and DB are both '0'. Under this condition, an encoder of the present disclosure will produce a PAM-4 signal having a voltage equal to V00. The next level of the PAM-4 signal corresponds to a condition where DA is '0', but DB is '1'. Under this condition, an encoder of the present disclosure will produce a PAM-4 signal having a voltage equal to V01. Continuing with the table of FIG. 2A, the next level of the PAM-4 signal corresponds to a condition where DA is '1', but DB is '0'. The voltage produced by the encoder under this condition corresponds to V10. Finally, the highest level of the PAM-4 signal corresponds to a condition where both DA and DB are '1'. Under this condition, an encoder of the present disclosure will produce a PAM-4 signal having a voltage equal to V11.

In contrast to PAM-4 encoders of the prior art and the encoding table of FIG. 1A, the difference between the voltage produced for the lowest level and its adjacent level (e.g., the second lowest level) is not necessarily the same as the difference between the voltage produced for the highest level and its adjacent level (e.g., the second highest level). Likewise the difference between the voltage produced for the second and third levels of the PAM-4 signal are not necessarily the same as the differences between voltage for any other pair of levels in the PAM-4 signal. More specifically, embodiments of the present disclosure propose a PAM-N encoder that increases voltages at each successive level by more than a constant amount. Referring back to the example of FIGS. 2A and 2B, the difference between V00 and V01 may correspond to a first difference (e.g., DS1), the difference between V01 and V10 may correspond to a second difference (e.g., DS2), and the difference between V10 and V11 may correspond to a third difference (e.g., DS3). In a non-limiting example, the PAM-4 encoder may encode the various levels of the PAM-4 signal according to the following rule: DS3>DS2>DS1. By increasing the difference between each successive level in the PAM-N signal, the encoder can improve the signal-to-noise ratio (SNR) of the PAM-N signaling. Following such an encoding scheme leads to a reduction of the transmitted levels of the least noisy symbols to maintain a constant peak-to-peak swing.

In other words, embodiments of the present disclosure propose to utilize a non-uniform PAM-N encoder that translates input digital signals (e.g., two NRZ signals in a PAM-4 situation) to a PAM-N signal having different gaps between at least two adjacent levels. Following the proposed encoding behavior of relaxing the linearity constraints of the laser driver's Integrated Circuit (IC), the system's SNR and bit error rate (BER) can be improved dramatically. Accordingly, the non-idealities and/or non-linear behavior of the system can be compensated for with a non-uniform encoding scheme.

In addition to improving system performance by implementing a new encoding scheme, it may also be possible to improve system performance at the transmission side by utilizing an improved driver configuration. Accordingly, with reference now to FIGS. 3-5, details of an improved system configuration having an improved driver will be described in accordance with embodiments of the present disclosure. It should be appreciated that the improved system configuration described herein can be utilized alone or in combination with the non-uniform encoding behavior described above with reference to FIGS. 2A and 2B.

Figure 3:
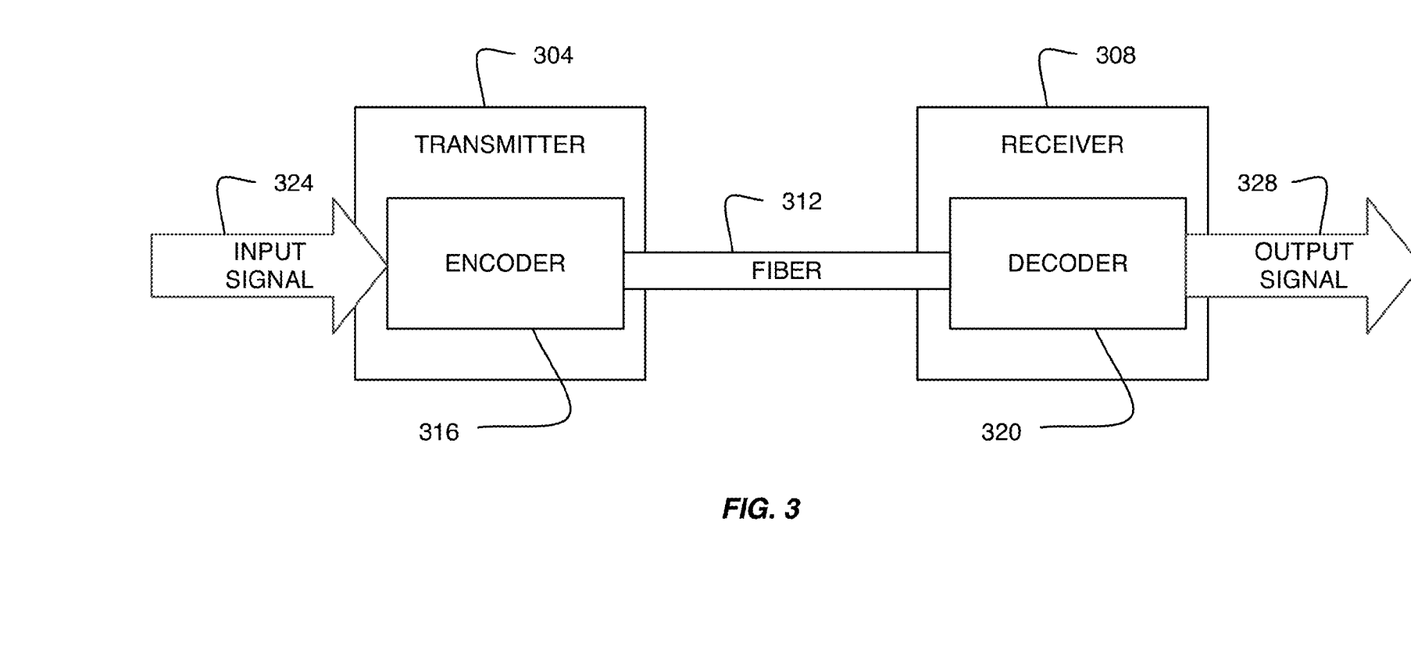
FIG. 3 is a block diagram depicting a data transmission system in accordance with embodiments of the present disclosure.

Referring now to FIG. 3, components of a data transmission system 300 will be described in accordance with embodiments of the present disclosure. The data transmission system 300 is shown to include a transmitter 304 and receiver 308 connected by an optical fiber link 312. The length of the optical fiber link 312 may be as small as a few meters or as long as several kilometers. The transmitter 304 and/or receiver 308 may be associated with a common computer network or may be separated by one or several communication networks. In some embodiments, the transmitter 304 and/or receiver 308 may be operating in a signal boosting station rather than being incorporated into a computing network.

In some embodiments, the transmitter 304 receives an input signal 324 from some computing device or from another fiber link. The input signal 324 may be in the form of a digital signal or a plurality of digital signals. For instance, the input signal 324 may correspond to two or more NRZ signals representing two different pieces of information. The transmitter 304 includes an encoder 316 that is configured to encode the input signal 324 and prepare the signal for transmission across the optical fiber link 312. In some embodiments, the encoder 316 comprises a laser (e.g., semiconductor laser) or similar source of coherent light. The encoder 316 may be driven by an input current and, in some embodiments, the encoder 316 may be configured to encode the input signal into a multi-level encoded signal, such as a PAM-N signal. However, the encoder 316 may inherently skew the multi-level encoded signal or introduce other non-idealities or non-linearities into the PAM-N signal.

The multi-level encoded signal may then be transmitted by the encoder 316 across the optical fiber link 312 where the encoded signal is received at the receiver 308. The receiver 308 may be configured to employ a decoder 320 to decode the multi-level encoded signal and produce a corresponding output signal 328, which may correspond to the digital signals of the input signal 324 (e.g., two or more NRZ signals). In some embodiments, the decoder 320 is configured to account for or otherwise correct the skew introduced into the signal by the encoder 316. In some embodiments, the decoder 320 may comprise a plurality of discrete decoding elements that are each adapted to sample different levels of the multi-level encoded signal transmitted by the encoder 316.

Figure 4:
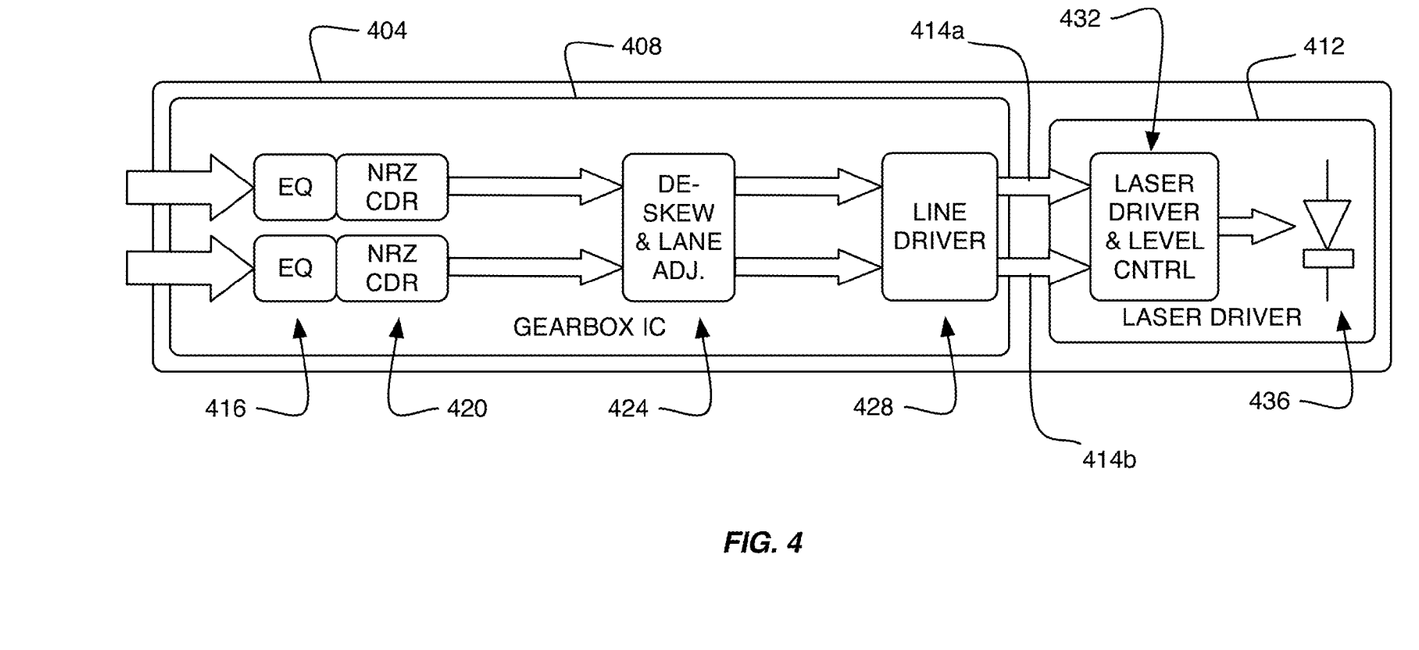
FIG. 4 depicts components of an encoder in accordance with embodiments of the present disclosure.

With reference now to FIG. 4, additional details of components that may be included in the transmitter 304 and, more specifically, may be included in the encoder 316 will be described in accordance with embodiments of the present disclosure. The transmission system 404, in some embodiments, may directly correspond to the encoder 316. In other embodiments, the transmission system 404 may correspond to a sub-component of the encoder 316.

The transmission system 404 is depicted as having two sets of sub-components, namely a gearbox IC 408 and a laser driver 412. While the remainder of this example will be described in connection with circuitry configured to drive a laser, laser diode, or a Vertical Cavity Surface-Emitting Laser (VCSEL), it should be appreciated that embodiments of the present disclosure are not so limited. In fact, the light source used to transmit the signal across the optical fiber link 312 may correspond to any one or collection of devices capable of transmitting light. Furthermore, although the gearbox IC 408 is depicted as only being configured to condition two separate input signals for transmission to the laser driver 412, the components of the transmission system 404 can be multiplied to accommodate a larger number of signals. The following example will be described in connection with encoding two NRZ signals into a PAM-4 signal for convenience of understanding.

In the depicted example, the gearbox IC 408 is shown to include a pair of equalizers 416, a pair of coders 420, a de-skew and lane adjust module 424, and a line driver 428. The laser driver 412 is shown to include a laser driver and level control module 432 and a light source 436 (e.g., laser, laser diode, VCSEL, etc.).

In accordance with at least some embodiments, the proposed architecture of the gearbox IC 408 enables the gearbox IC 408 to align and encode multiple data streams (e.g., a first NRZ data stream for DA and a second NRZ data stream for DB). The equalizer 416 and coder 420 condition the separate data streams to comparable amplitudes. The NRZ coders 420 then output the separate data streams to the de-skew and lane adjust module 424, which basically aligns the phases of the two data streams. The output of the de-skew and lane adjust module 424 is then provided to the line driver 428, which outputs two separate data streams 414a, 414b to the laser driver 412.

In accordance with some embodiments of the present disclosure, the gearbox IC 408 is a single IC having its components incorporated therein. The laser driver 412 may be connected to the gearbox IC 408 via two separate leads, one of which carries the first NRZ data stream output by the line driver 428 and the other of which carries the second NRZ data stream output by the line driver 428. This means that the interface trace bandwidth of each interface trace between the gearbox IC 408 and the laser driver 412 can be reduced. In other words, the traces on a Printed Circuit Board (PCB) or the like that carry the separate data streams 414a, 414b can be significantly smaller than if a single trace was used to carry a PAM-4 signal from the gearbox IC 408 to the laser driver 412 as is currently done in existing systems. This reduction of interface trace bandwidth leads to a lower cost and power-optimal solution for the entire transmission system 404. Specifically, even though two traces are used to connect the gearbox IC 408 to the laser driver 412 instead of one, the total costs of the two traces required for high bandwidth signals (e.g., two 10 Gbit/sec NRZ data streams) is less than the cost to support a PAM-4 signal of double the bandwidth requirement.

Upon receiving the two separate data streams from the gearbox IC 408, the laser driver and level control module 432 can generate the necessary PAM-N encoded signal, which is used to drive the light source 436. The light source 436 subsequently transmits the PAM-N encoded signal across the link 312. It should be appreciated that the transmission system 404 may be configured to accommodate any number of signals have any data rate frequency. As a non-limiting example, the transmission system 404 may be configured to receive two or more 10G NRZ data streams and transmit a single 20G PAM-4 signal. When operating at these high frequencies, the non-linearities and/or non-idealities of the light source 436 and the other components in the laser driver 412 may arise; thus, it may be desirable to utilize the non-uniform encoding techniques described above in combination with the proposed transmission system 404, although such a construction is not required. That is, the transmission system 400 may also be utilized in connection with a traditional linear encoding scheme.

In some embodiments, the gearbox IC 408 and laser driver 412 configuration enables the gearbox IC 408 and the PCB connecting the gearbox IC 408 with the laser driver 412 to utilize less expensive and more power efficient components. If the gearbox IC 408 were required to output a PAM-N signal to the laser driver, the modifications to the IC would be non-trivial and the components needed to carry the PAM-N signal to the laser driver 412 would be much more expensive and consume significantly more power than the proposed system 404 configuration.

Signal Receiving and Decoding

In addition to the improved encoding schemes described above, additional improvements can be implemented in a PAM-N receiver to improve the system's overall SNR and BER performance. Such receiver solutions can be implemented independent to the above-described encoding solutions or encoder configurations, but could also be applied to a system utilizing the non-uniform encoding behavior and/or improved gearbox IC 408 to further increase the system's performance.

Figure 5:
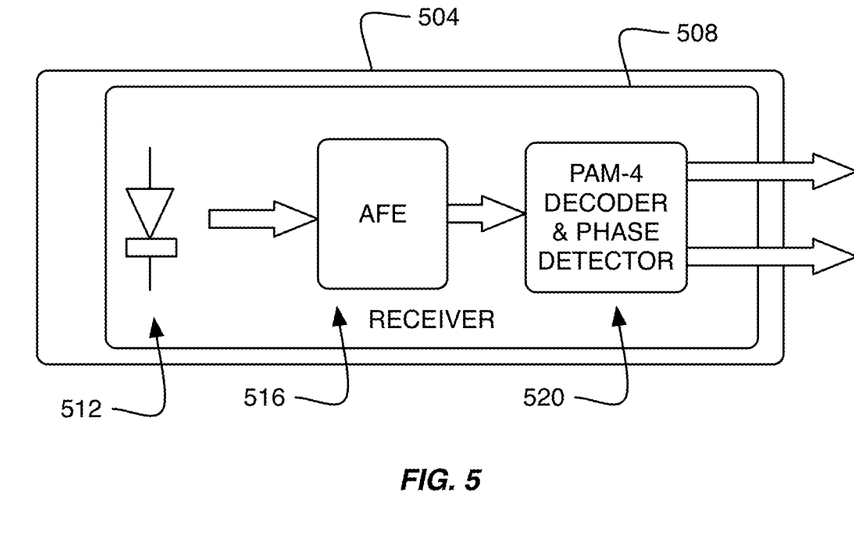
FIG. 5 depicts components of a decoder in accordance with embodiments of the present disclosure.

With reference now to FIG. 5, additional details regarding the receiving side of a data transmission system will be described in accordance with embodiments of the present disclosure. Specifically, an improved set of receiver components 504 will be described. The receiver components 504 may constitute some or all of the receiver 308 or the decoder 320 contained within the receiver 308. The receiver components 504 may comprise a receiver IC 508 having a light detector 512, an Analog Front End (AFE) 516, and a decoder and phase detector module 520.

The light detector 512 may correspond to any device or collection of devices configured to convert light energy into an electrical signal. Non-limiting examples of a suitable light detector 512 include a photodetector, a photo diode, a photo resistor, or the like. Moreover, the light detector 512 may or may not be mounted on or integrated into the receiver IC 508.

The light detector 512 provides an electrical output signal to the AFE 516, which forwards the signal to the decoder and phase detector module 520. In some embodiments, the signal provided to the decoder and phase detector module 520 may correspond to a PAM-N signal; thus, although a PAM-4 decoder is depicted in FIG. 5, it should be appreciated that any type of decoder may be utilized without departing from the scope of the present disclosure.

The decoder and phase detector module 520 samples the received signal and produces two or more separate digital output signals. As an example, the decoder and phase detector module 520 may output two or more NRZ signals, which may correspond to DA and DB as shown in FIGS. 2A and 2B.

As mentioned above, in some embodiments, the receiver components 504 may simply behave like a traditional PAM-N receiver and decoder. However, in other embodiments, the receiver components 504 and particularly the decoder and phase detector module 520 may correspond to a modified non-uniform sampling receiver. In some embodiments, the receiver components 504 may be configured to introduce a code-dependent amplitude offset so that the system's SNR is optimized. More specifically, and with reference to FIG. 6, a modified non-uniform receiver architecture may be configured to sample the PAM-N signal at levels V0, V1, and V2, which are adjustable and/or not necessarily equidistance apart. Said another way, the receiver may be configured to sample the PAM-4 signal at voltages that are selected to minimize the increased noise introduced at the higher levels of the signal. Thus, V2-V1 is not necessarily equal to V1-V0.

Figure 6:
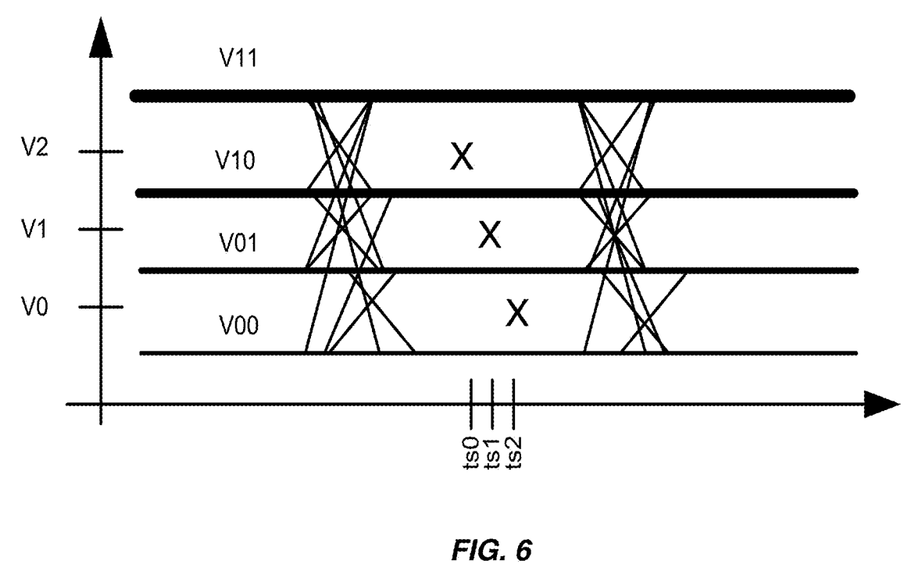
FIG. 6 depicts an improved sampling technique for decoding a PAM-4 encoded signal in accordance with embodiments of the present disclosure.

Furthermore, the receiver may set levels V0, V1, and/or V2 at positions other than equidistance between the adjacent levels. Said another way, V0 may be closer to V00 than V01 so as to avoid the higher amount of noise on V01 as compared to V00. Likewise, V1 may be closer to V01 than V10 and V2 may be closer to V10 than V11. As a non-limiting example, since the higher levels may comprise a higher amount of noise, it may be desirable to sample at levels V0, V1, and V2 such that the distance between V0 and V1 is different than the distance between V1 and V2. Such a sampling scheme can help to increase the system's overall SNR and BER.

In some embodiments, the receiver may also selectively adjust the values of V0, V1, and/or V2 depending upon current operating conditions of the system, thereby providing a dynamic optimization. Moreover, since the higher levels of the PAM-N signal contribute more noise than the lower levels, it may be desirable or sufficient to only measure the noise at the highest level (e.g., V11) to determine what adjustments should be made to some or all of the sampling levels V0, V1, and/or V2.

In addition to or as an alternative optimization to the proposed code-dependent amplitude offset, the decoder and phase detection module 520 may be configured to perform a code-dependent (also referred to as a level-dependent) timing offset. As shown in FIG. 6, it may be desirable to sample the different levels of the PAM-N signal at offset sample times. This code-dependent timing offset may be desirable since the optical components of the data transmission system may cause different levels of the PAM-N signal to be skewed or delayed relative to one another. In particular, it may be desirable to sample the highest levels of the signal earlier in time than the lower levels. A number of different receiver architectures may be employed to achieve the code-dependent timing offset.

Figure 7:
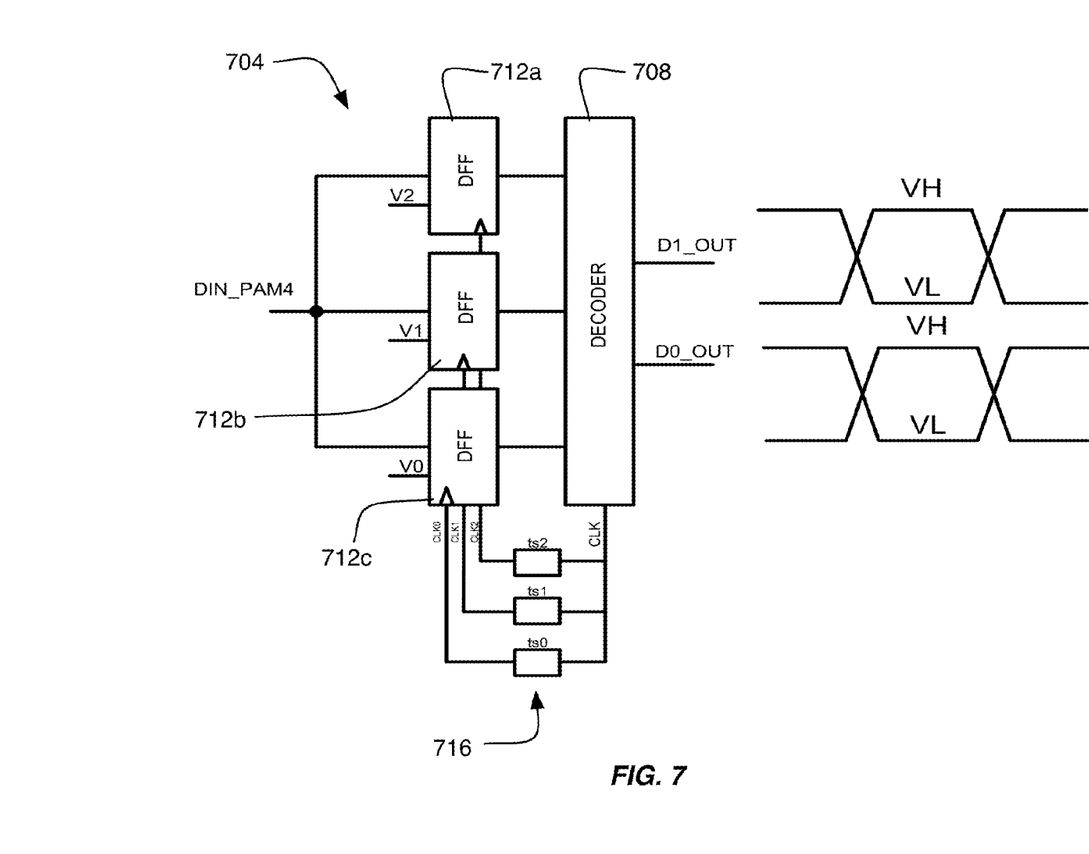
FIG. 7 depicts a first receiver structure to achieve the decoding of FIG. 6.
Figure 8:
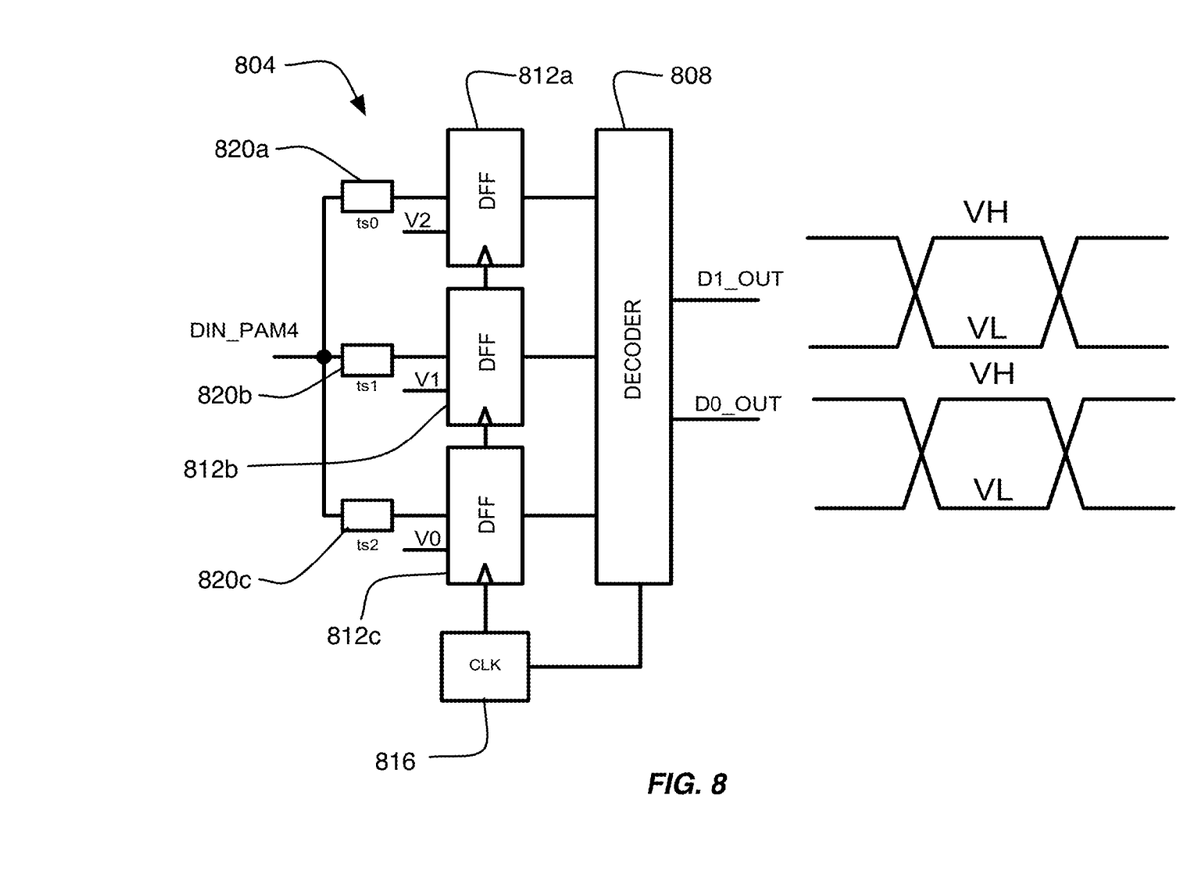
FIG. 8 depicts a second receiver structure to achieve the decoding of FIG. 6.
Figure 9:
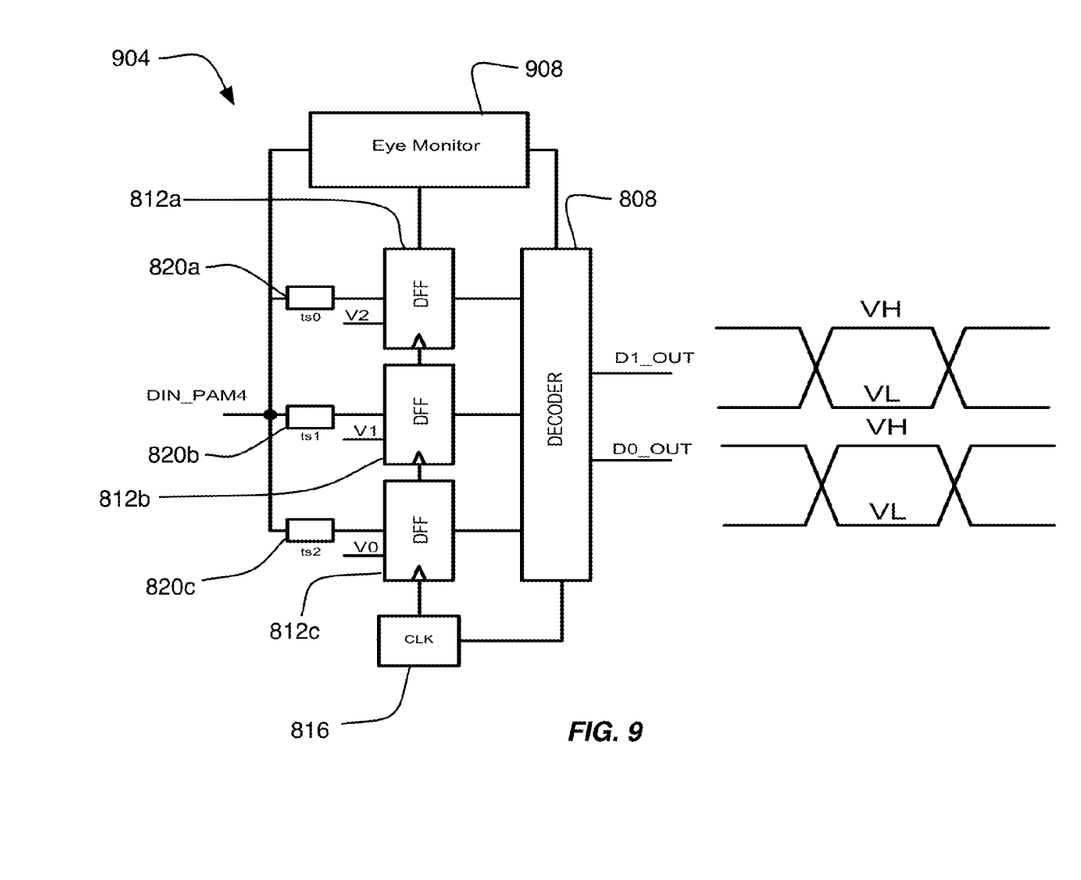
FIG. 9 depicts a third receiver structure to achieve the decoding of FIG. 6.

With reference now to FIGS. 7-9, examples of the various receiver architectures that can achieve the code-dependent timing offset will be described in accordance with embodiments of the present disclosure. As with other improvements described herein, it should be appreciated that this code-dependent timing offset can be used alone or in any combination with the other improvements to increase the system's SNR and BER.

The first example of such a receiver architecture 704 implementing a code-dependent timing offset is shown in FIG. 7. The illustrated receiver architecture 704 comprises a decoder 708 and a plurality of comparators 712a, 712b, 712c, which may correspond to sampling flip-flops or the like. Each comparator 712a, 712b, 712c receives the input encoded signal (e.g., the PAM-N or PAM-4 signal). The first comparator 712a samples the input signal at a sample time delayed by ts2 and compares the sampled value with V2. The second comparator 712b samples the input signal at a sample time delayed by ts1 and compares the sampled value with V1. The third comparator 712c samples the input signal at sample time delayed by ts0 and compares the sampled value with V0. In the depicted embodiment, V2>V1>V0 and ts2>ts1>ts0.

The particular architecture 704 shows that the timing delay for each comparator 712a, 712b, 712c is controlled by a clock value received from the decoder 708, but delayed by different amounts from one level to the next. In other words, receiver architecture 704 introduces timing skew on the clock phases to the receiver's sampling flip-flops. The timing skew is introduced by controlling the delay of the receiver's clock to the comparators 712a, 712b, 712c. Moreover, the code-dependent delay can be adaptive and controlled by the receiver's phase detector or can be digitally pre-programmed and set to system-specific parameters that characterize the light source's asymmetric rise and fall times, the system's non-stationary noise components, and the IC's non-linearities. In the case of an adaptive delay, the phase detector can lock on any of the eyes in the PAM-N signal.

While the illustrative architecture 704 shows the concept of delaying sample times, it should be appreciated that the architecture 704 could be alternatively configured to advance the sample time of one level relative to another. More specifically, the sample time of a first comparator could be advanced relative to the sample time of another comparator by advancing the clock signal provided to the first comparator as compared to the other comparators. Thus, while examples described herein utilize the concept of sample delay, it should be appreciated that embodiments of the present disclosure are not so limited and sampling can be advanced as opposed to delayed to compensate for the non-linearities and/or non-idealities of the system.

FIG. 8 depicts a second receiver architecture 804 capable of implementing a code-dependent timing offset in accordance with embodiments of the present disclosure. The second receiver architecture 804 is similar to the first receiver architecture 704 in that the second receiver architecture 804 comprises a decoder 808, a plurality of comparators 812a, 812b, 812c (e.g., sampling flip-flops), and a clock signal 816. The second receiver architecture 804, however, introduces the timing skew to the input signal itself via delays 820a, 820b, 820c rather than the clock 816 phases to the receiver's comparators 712a, 712b, 712c. Similar to the first architecture 704, the second architecture 804 can have the code-dependent delay be adaptive and controlled by the receiver's phase detector or the delay can be digitally pre-programmed and set to system-specific parameters that characterize the light source's asymmetric rise and fall times, the system's non-stationary noise components, and the IC's non-linearities. In the case of an adaptive delay, the phase detector can lock on any of the eyes in the PAM-N signal.

As with the first architecture, the second architecture 804 can alternatively be modified to utilize signal advancement instead of signal delay. For instance, the PAM-N signal can be advanced to one comparator as compared to other comparators rather than delaying the PAM-N signal.

FIG. 9 shows a third receiver architecture 904 where the adaptive delay from one level to the next is achieved by use of an eye monitor 908. Specifically, the third receiver architecture 904 is similar or identical to the second receiver architecture 904 except that the eye monitor 908 is used to dynamically control the delay values 820*a*, 820*b*, 820*c* imparted on the inputs signal. Of course, the eye monitor 908 could also be incorporated into the first receiver architecture 704 to dynamically control the delays to the clock signal. In some embodiments, the code-dependent delay and the code-dependent amplitude sampling points Vi (e.g., V0, V1, V2, etc.) can both be adaptive and controlled by the receiver's phase detector or the eye monitor 908. Specifically, a phase detector could be utilized to optimize delays ts0, ts1, and/or ts2 based on current system conditions. Alternatively or additionally, the eye monitor 908 could be used to adaptively optimize the amplitude thresholds Vi (e.g., V0, V1, and/or V2).

By using some or all of the techniques described herein, a data transmission system's performance can be greatly enhanced and/or the costs associated with building and implementing such a system can be reduced.

Figure 10:
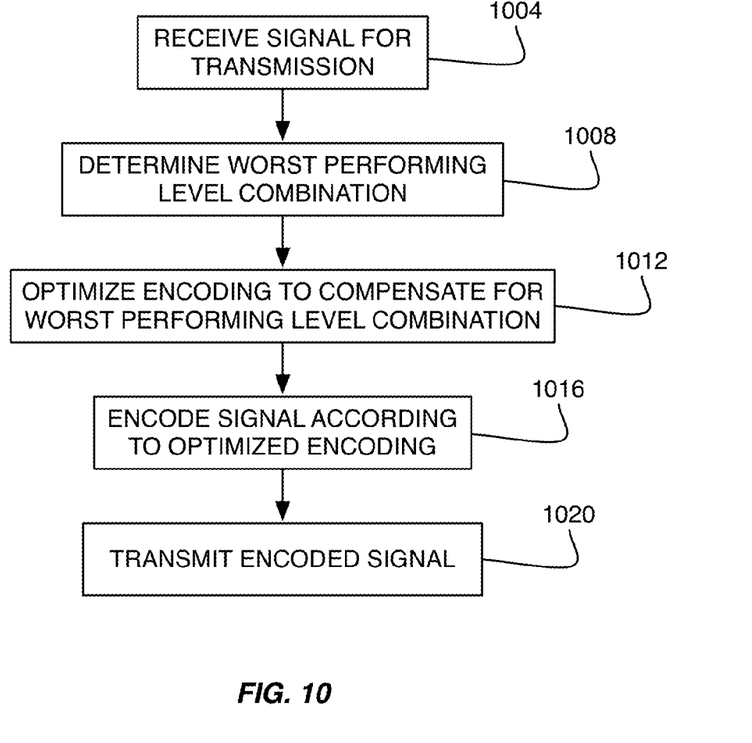
FIG. 10 is a flow chart depicting an encoding method in accordance with embodiments of the present disclosure.

With reference now to FIG. 10, a method of encoding and transmitting a signal will be described in accordance with embodiments of the present disclosure. The method begins when an encoder 316 or components thereof receives an input signal 324 for transmission across a communication network (step 1004). The encoder 316, in some embodiments, may be configured to encode the input signal 324 using a multi-level amplitude modulation scheme, such as PAM-N. As a non-limiting example, the encoder 316 may be configured to encode the signal by modulating a laser, whose response or encoding speed may be dependent upon the drive level of the current which is supplying the modulation signal. In a PAM-4 situation, for example, the response of the laser will be the fastest at the upper levels and slowest at the lower levels. Moreover, in a PAM-4 situation the upper levels may have more noise than the lower levels.

Accordingly, the method continues with the encoder 316 determining the worst performing level combination (step 1008) and optimizing its encoding to compensate for the worst performing level combination (step 1012). Continuing the PAM-4 example, the encoder 316 may determine that the higher levels of the PAM-4 signal will have more noise than the lower levels of the PAM-4 signal and may implement a non-uniform PAM-4 encoding scheme to counteract the increased noise introduced at the higher levels by the non-linearities and/or non-idealities of the system. It should be appreciated, however, that the implementation of the non-uniform PAM-4 encoding scheme may correspond to an optional step.

The method continues with the encoder 316 encoding the signal according to the determined encoding scheme (e.g., the optimize encoding scheme) (step 1016). The encoded signal is then transmitted across the optical fiber link 312 (step 1020). In some embodiments, the transmitted signal may correspond to a PAM-N signal that is either uniformly or non-uniformly encoded on a per-level basis.

Figure 11:
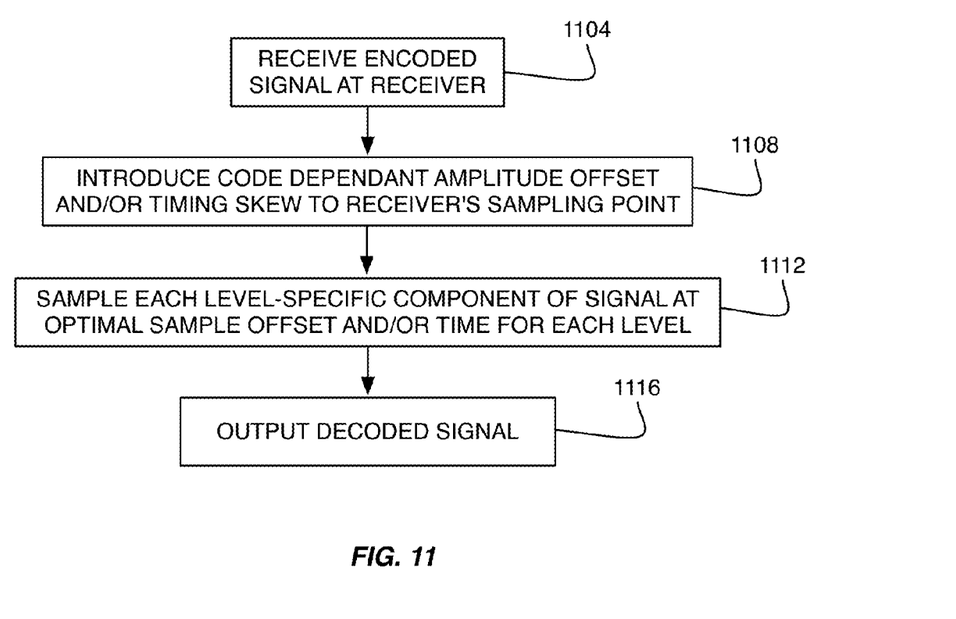
FIG. 11 is a flow chart depicting a decoding method in accordance with embodiments of the present disclosure.

With reference now to FIG. 11, a method of receiving and decoding a signal will be described in accordance with embodiments of the present disclosure. The steps of the receiving method may or may not be performed in combination with the optimization steps described in the transmitting/encoding method.

The method begins when an encoded signal is received at the receiver 308 (step 1104). The receiver 308 then employs its decoder 320 to introduce one or both of code-dependent amplitude offset and/or timing skew at the receiver's sampling points (step 1108). The code-dependent timing skew may be imparted in a number of different ways (e.g., using any of the architectures described herein above) and the code-dependent amplitude offset may be implemented with or without the code-dependent timing skew.

The decoder 320 then samples each level-specific component of the signal at the desired amplitude offset and/or time (e.g., by introducing a delay on a per-level-basis) (step 1112). Using the sampled values, the decoder 320 is then able to decode the received signal into two or more digital signals (e.g., two or more NRZ data streams) that can be output to a separate receiving circuit or the like (step 1116).

This output decoded signal may be provided to a computer or computer network for processing or may be re-encoded for re-transmission across another optical fiber link 312. By following the above method and optimizing the signal output by the encoder 316, the proposed system and method can enhance the SNR and BER of the overall data transmission system and improve the performance and robustness of multi-level-coding based communication links.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor (GPU or CPU) or logic circuits programmed with the instructions to perform the methods (e.g., Application Specific Integrated Circuits (ASICs), Field-Programmable Gate Arrays (FPGAs), or the like). These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

Specific details were given in the description to provide a thorough understanding of the embodiments. However, it will be understood by one of ordinary skill in the art that the embodiments may be practiced without these specific details. In other instances, well-known circuits, processes, algorithms, structures, and techniques may be shown without unnecessary detail in order to avoid obscuring the embodiments.

While illustrative embodiments of the disclosure have been described in detail herein, it is to be understood that the inventive concepts may be otherwise variously embodied and employed, and that the appended claims are intended to be construed to include such variations, except as limited by the prior art.

What is claimed is:

1. A transmitter, comprising:
a gearbox Integrated Circuit (IC) configured to receive two or more separate digital signals and align a phase of the two or more separate digital signals with one another; and
a laser driver IC comprising a light source and a laser driver and level control module configured to control operation of the light source by converting the two or more separate digital signals received from the gearbox IC into a single multi-level-coded signal and then driving the light source with the single multi-level-coded signal, wherein the multi-level-coded signal comprises a Pulse Amplitude Modulated N-level (PAM-N) signal and wherein the two or more separate digital signals comprise two or more Non-Return-to-Zero (NRZ) signals.

2. The transmitter of claim 1, wherein the gearbox IC is connected to the laser driver IC with two or more separate leads, a first of the two or more separate leads carrying a first digital signal from the gearbox IC to the laser driver IC, and a second of the two or more separate leads carrying a second digital signal from the gearbox IC to the laser driver IC.

3. The transmitter of claim 2, wherein the two or more separate leads correspond to discrete traces on a Printed Circuit Board (PCB).

4. The transmitter of claim 1, wherein the laser driver and level control module converts the two or more separate digital signals into the single multi-level-coded signal using a uniform encoding mapping such that each level of the single multi-level-coded signal is a uniform distance from adjacent levels of the single multi-level-coded signal.

5. The transmitter of claim 1, wherein the laser driver and level control module converts the two or more separate digital signals into the single multi-level-coded signals using a non-uniform encoding mapping such that a first set of adjacent levels in the single multi-level-coded signal are separated by a first distance and a second set of adjacent levels in the single multi-level-coded signal are separated by a second distance that is greater than the first distance.

6. The transmitter of claim 5, wherein the second set of adjacent levels is higher than the first set of adjacent levels and wherein a level in the second set of adjacent levels produces more noise than any level in the first set of adjacent levels.

7. The transmitter of claim 1, wherein the light source comprises at least one of a laser, a laser diode, and a Vertical Cavity Surface-Emitting Laser (VCSEL) and wherein the laser driver and level control module directly modulates the light source.

8. A data transmission method, comprising:
receiving a first digital signal at a gearbox Integrated Circuit (IC);
receiving a second digital signal at the gearbox IC;
aligning a phase of the first digital signal with a phase of the second digital signal;
outputting the aligned first and second digital signals from the gearbox IC;
receiving the aligned first and second digital signals at a laser driver and level control module;
converting the aligned first and second digital signals into a single multi-level-coded signal; and
using the single multi-level-coded signal to drive a light source, wherein the multi-level-coded signal comprises a Pulse Amplitude Modulated N-level (PAM-N) signal and wherein the first digital signal and second digital signal each correspond to a Non-Return-to-Zero (NRZ) signal.

9. The method of claim 8, wherein the aligned first and second digital signals are output by the gearbox IC on separate leads.

10. The method of claim 8, wherein the laser driver and level control module is contained in a laser driver IC that is separate from the gearbox IC.

11. The method of claim 8, wherein the laser driver and level control module converts the two or more separate digital signals into the single multi-level-coded signal using a uniform encoding mapping such that each level of the single multi-level-coded signal is a uniform distance from adjacent levels of the single multi-level-coded signal.

12. The method of claim 8, wherein the laser driver and level control module converts the two or more separate digital signals into the single multi-level-coded signals using a non-uniform encoding mapping such that a first set of adjacent levels in the single multi-level-coded signal are separated by a first distance and a second set of adjacent levels in the single multi-level-coded signal are separated by a second distance that is greater than the first distance.

13. The method of claim 12, wherein the second set of adjacent levels is higher than the first set of adjacent levels and wherein a level in the second set of adjacent levels produces more noise than any level in the first set of adjacent levels.

14. The method of claim 8, further comprising:
directly modulating the light source with the single multi-level-coded signal.

15. A data transmission system, comprising:
a laser driver Integrated Circuit (IC) comprising a light source and a laser driver and level control module that directly modules the light source thereby causing the light source to transmit data;
a gearbox IC comprising a line driver that provides an output to the laser driver that includes at least a first and second digital signal, the gearbox IC comprising:
at least a first and second equalizer that independently equalize the at least a first and second digital signal; and
de-skew and lane adjustment module that substantially align the at least a first and second digital signals with one another prior to the line driver sending the at least a first and second digital signal to the laser driver; and
at least a first and second trace connecting the line driver of the gearbox IC to the laser driver IC, wherein the at least a first and second digital signal are provided from the gearbox IC to the laser driver via the at least a first and second trace.

16. The data transmission system of claim 15, wherein the laser driver and level control module directly modulates the light source with a multi-level-coded signal obtained by encoding the at least a first and second digital signals using a uniform encoding mapping.

17. The data transmission system of claim 15, wherein the laser driver and level control module directly modulates the light source with a multi-level-coded signal obtained by encoding the at least a first and second digital signals using a non-uniform encoding mapping.

18. A transmitter, comprising:
- a gearbox Integrated Circuit (IC) configured to receive two or more separate digital signals and align a phase of the two or more separate digital signals with one another; and
- a laser driver IC comprising a light source and a laser driver and level control module configured to control operation of the light source by converting the two or more separate digital signals received from the gearbox IC into a single multi-level-coded signal and then driving the light source with the single multi-level-coded signal, wherein the laser driver and level control module converts the two or more separate digital signals into the single multi-level-coded signals using a non-uniform encoding mapping such that a first set of adjacent levels in the single multi-level-coded signal are separated by a first distance and a second set of adjacent levels in the single multi-level-coded signal are separated by a second distance that is greater than the first distance, wherein the second set of adjacent levels is higher than the first set of adjacent levels, and wherein a level in the second set of adjacent levels produces more noise than any level in the first set of adjacent levels.

19. The transmitter of claim 18, wherein the gearbox IC is connected to the laser driver IC with two or more separate leads, a first of the two or more separate leads carrying a first digital signal from the gearbox IC to the laser driver IC, and a second of the two or more separate leads carrying a second digital signal from the gearbox IC to the laser driver IC and wherein the two or more separate leads correspond to discrete traces on a Printed Circuit Board (PCB).

20. The transmitter of claim 1, wherein the laser driver and level control module converts the two or more separate digital signals into the single multi-level-coded signal using a uniform encoding mapping such that each level of the single multi-level-coded signal is a uniform distance from adjacent levels of the single multi-level-coded signal, wherein the multi-level-coded signal comprises a Pulse Amplitude Modulated N-level (PAM-N) signal, and wherein the two or more separate digital signals comprise two or more Non-Return-to-Zero (NRZ) signals.

* * * * *